March 29, 1966  A. KÄSER  3,243,110

SINGLE AXIS DISK CALCULATOR

Filed March 24, 1965  3 Sheets-Sheet 1

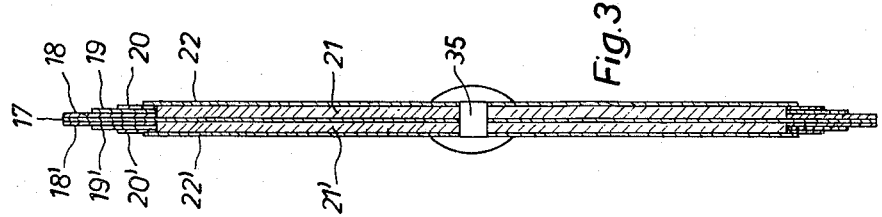
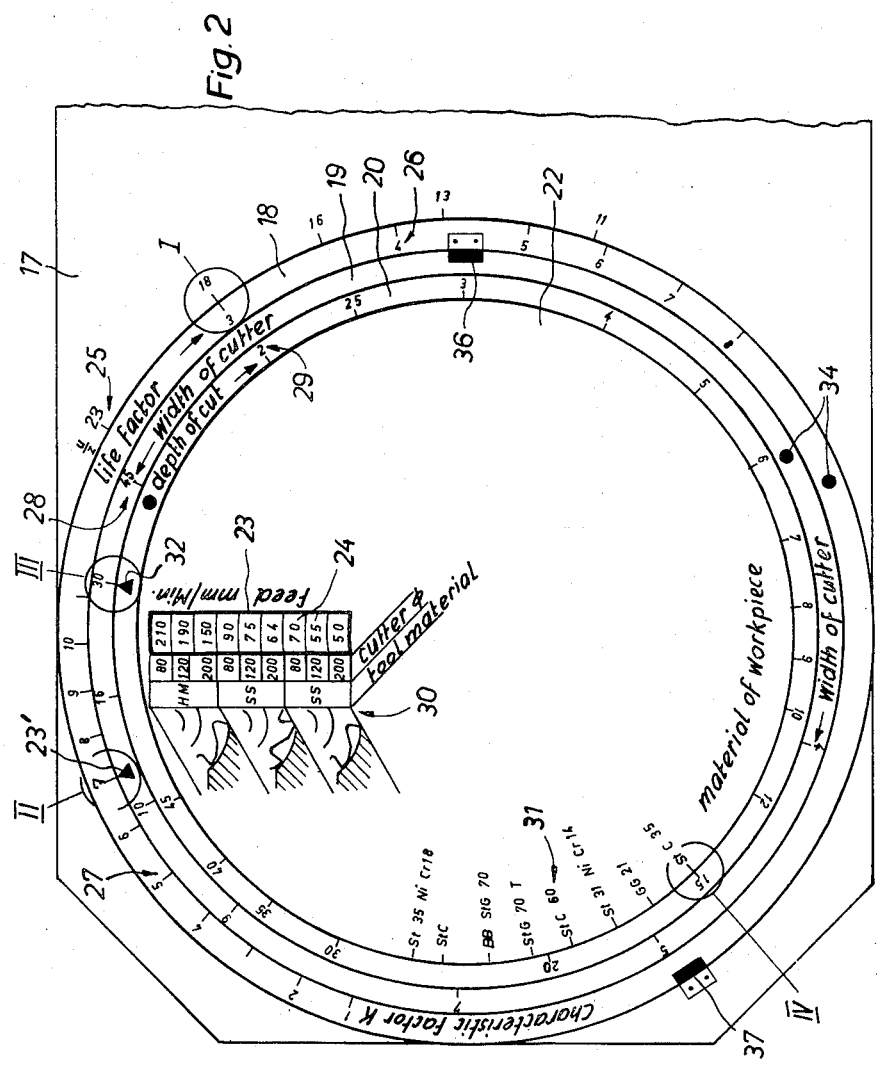

March 29, 1966  A. KÄSER  3,243,110
SINGLE AXIS DISK CALCULATOR
Filed March 24, 1965  3 Sheets-Sheet 3
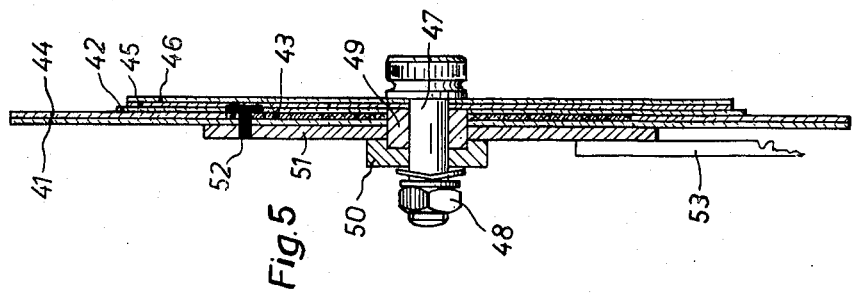
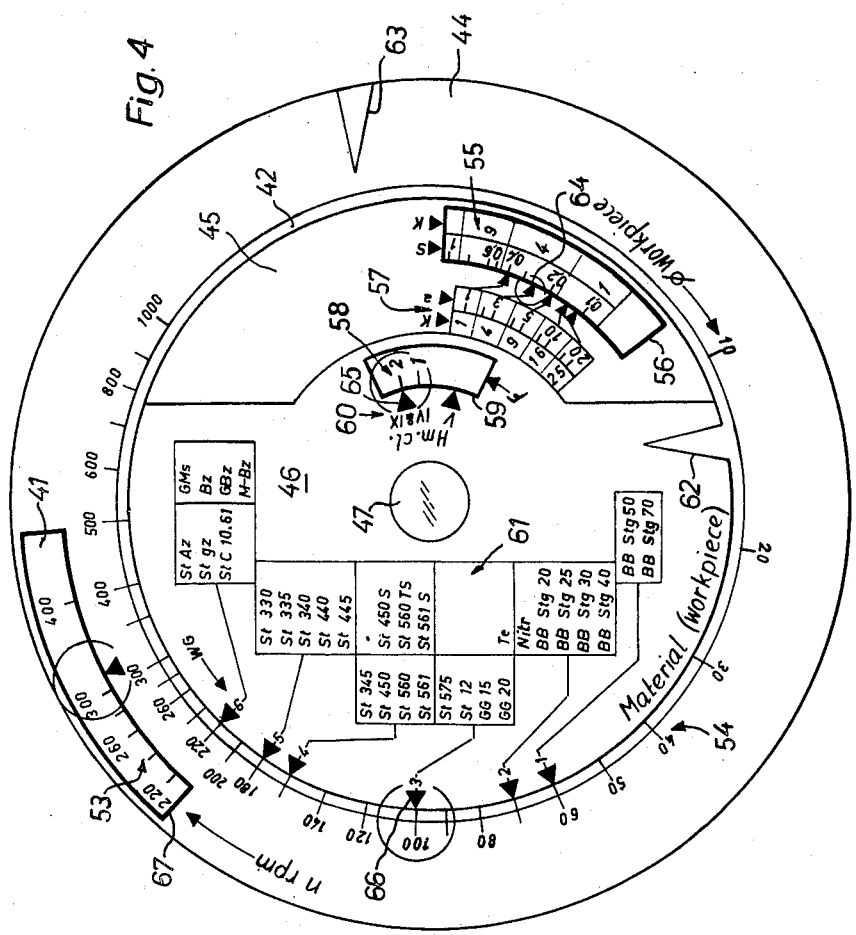

United States Patent Office 3,243,110
Patented Mar. 29, 1966

3,243,110
SINGLE AXIS DISK CALCULATOR
Alfred Käser, 5 Austrasse, Rieden, near Nussbaumen,
Aargau, Switzerland
Filed Mar. 24, 1965, Ser. No. 442,330
Claims priority, application Switzerland, Mar. 26, 1964,
3,900/64; Dec. 22, 1964, 16,516/64
4 Claims. (Cl. 235—78)

This invention relates to table computers of the slide rule type for determining the working conditions, and particularly the cutting conditions for metal-cutting of workpieces.

It has been found of great importance in industrial production to determine correct dates and values for the use in metal-cutting of workpieces, i.e. to determine with the highest degree of accuracy the cutting conditions which are normally the feed and cutting speed. This necessitates long studies of the relations between machine tool, tool and workpieces, in order to have available at least those values and factors which appear day after day in industrial operations.

Production research engineers therefore are continuously working with functions between values which are partly constant and partly variable. For determining the values of the cutting and feed rate there are usually used standard values which are available in the form of tables. Such tables are for example giving the values for the cutting speed V and the feed rate S in function of:

Cutting edge material (hard metal or high-speed steel edge);
Material of the workpiece;
Type of the tool (milling cutter, cutting tool etc.).

For carrying out the necessary calculation work special computers or slide rules are used. They are so constructed that the cutting conditions may be determined by a number of adjustments of the computer, and by reading intermediary values, in accordance with the following formulae:

$$V = \frac{d \cdot \pi \cdot n}{1000}$$

$$S' = n \cdot Z \cdot Sz \text{ or } S' = n \cdot Sn$$

wherein:

$d$ = diameter of the tool
$n$ = number of revolutions
$Z$ = number of teeth
$Sz$ = feed per tooth
$Sn$ = feed per revolution.

Since the tables are limited on functions of not more than three variables (two influence factors), and since the actually known computer and slide rules do not permit to take into account further influence factors, a great number of such factors are individually evaluated by the calculator or production engineer. It is to be noted that such methods do not allow to determine with sufficient accuracy the cutting conditions.

It is one object of the present invention to provide a table-computer of the slide rule type, in which the simple and exact mathematic functions are replaced by functions depending themselves on different variables or influence factors, such as:

(a) Values or factors depending on the nature of the tool:
  (1) Type of the tool (milling cutter, drill bit, cutting tool, etc.)
  (2) Metal of the cutter (hard metal, high speed steel edge)
  (3) Dimensions of the tool (diameter, cross section of the shaft)
  (4) Life factor (b) Values or factors depending on the workpiece:
  (5) Material of the workpiece
  (6) Depth of cut
  (7) Comportment of the workpiece during the cutting operation, wherein the following values are considered under the name "characteristic factor" K $X_1$: Construction of the machine tool
$X_2$: Construction of the workpiece holder or manner of holding or clamping the workpiece
$X_3$: Type of the tool (strong or weak tool) and manner of holding the tool
$X_4$: Construction or nature of the workpiece.

The problems to resolve by this table-computer, which constitutes a new auxiliary means for workshop and office are:

To describe all of the workpieces which in the next years will probably have to be worked in a determined part of the industrial section, for example in the turning section, with a sufficiently great number of characteristic values, i.e. with the so called statistical values. In other terms, the computer object of this invention should allow to determine either directly or indirectly the cutting conditions for all those workpieces which have to be worked in a determined manner (cutting, milling). Thereby at least some of the foregoing influence factors must be taken into consideration.

To allow the operator to find out in a simple way and quickly the optimum values of the cutting conditions.

To permit control of the operation, i.e. to permit comparation of the calculated values with the effective values of the cutting conditions. Such control is actually impossible, since there are no useful data available.

To permit determination of stochastic dependence. This is very important in the fabrication of single pieces or of small series, where the determined values and functions are normally replaced by stochastical values, i.e. values which will in reality be the most probable.

In accordance with the present invention the table-computer of the slide rule type comprises a first group of disks or disk-segments having thereon scales in terms of values depending on the nature of the tool, a second group of disks having thereon scales in terms of further values depending on the tool and scales in terms of tabulated values depending on the nature of the workpiece, a number of reference marks and reading windows for setting and adjusting each scale on a predetermined given value of an adjacent scale, whereby the said adjustments bring the various scales in a position such that the values depending on said predetermined given values appear automatically at the result indicating places.

Further objects and advantages of the invention will hereinafter be further described by way of example and with reference to the accompanying drawings, in which:

FIGURE 2 is a second embodiment of a table-computer for determining the optimum feed rate for a milling operation;

FIGURE 3 is a cross section through the computer of FIGURE 2;

FIGURE 4 is a table-computer for determining stochastical values, i.e. in reality probable values for the cutting conditions of a turning operation, and FIGURE 5 is a cross section through the computer of FIGURE 4.

Figure 1:
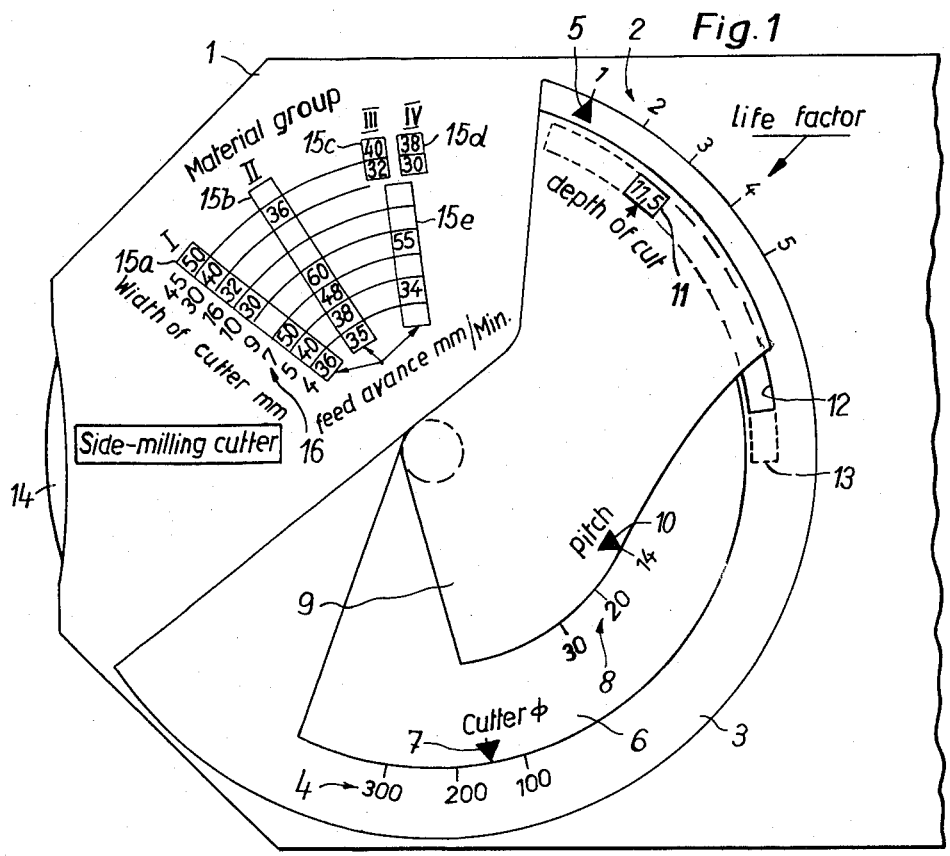
FIGURE 1 shows a table-computer of the slide rule type for determining the feed rate for a milling operation in dependence of several influence factors.

In order to clear up some expressions and terms which will appear in the following part of the specification, the terms "characteristic factor" K and "life factor" F will first be further explained. The characteristic factor is in close relationship with the exploitation of the machines, whilst the life factor takes into consideration the use of the cutting tools from the economical point of view.

The functions and values which are united in the factor K are differing from one plant to another, and are further varying in a same plant. They are for example varying with new and improved holder devices or with more efficient cutting tools, so that this values must be determined and periodically revised by the technical statistics. These values may be united in tables. Tables for the use in production of single pieces usually do not contain "exact values" but rather "probably exact values," i.e. values which can be observed with a dispersion error of about ±25%. The values which are actually considered as being exact are within a dispersion field ranging between +200% and −60%. This field can be reduced by the use of more precise basis data.

Similar consideration may be applied to the factor F. The values of F which can be found hereinafter reported in graduated scales on the disks of the computer represent in reality the life factor in hours in connection with the cutting speed, i.e. the computer is so constructed that the optimum values of the cutting speed and life factor are represented in function of for example the depth of cut, feed rate and material (hard metal class) of the tool. Since it is difficult to have optimum cutting conditions (optimum=sum of all costs is minimum), and since the most economical life factor is varying with the tools in use, the lift factor has to be determined for each group of material of the workpiece by means of the technical statistics. These values of the life factor also have to be revised periodically. If the previously determined life factor is 2 hours for hard metal class IV and a scale position (see hereinafter) on factor $F=6$, this means that the cutting speed is 28% less than the optimum value of the speed. To permit corrections the scale has been designated F and not directly life factor (in hours).

The computer shown in FIGURE 1 serves for determining the feed rate for a milling operation in function of the most important influence factors.

The base disk or plate 1 has thereon a logarithmical scale 2 in terms of the life factor F. A disk segment 3 is provided with a scale 4 in terms of the diameter of the tool (side-milling cutter). An adjusting mark 5 is fixed on the rotatable disk segment 3 and serves for bringing the segment 3 in a determined relative position with respect to the base disk 1. A further segment 6 is provided in front of segment 3 and carries thereon a fixed mark 7, serving to bring the segment 6 in a determined relative position with respect to the segment 3, and a scale 8 in terms of the pitch of the tool. A last segment 9 completing this group of disks is arranged above the segment 6 and has thereon a mark 10 for adjusting the segment 9 with respect to segment 6, and an opening or window 11, which opening permits to read, through circular slots 12 and 13 in the disks 1 and 3, a determined part of a scale on a disk 14 which is arranged on the back side of the base disk 1. This latter scale contains the values of the selected depth of cut. On the same disk 14, and also on the side facing, the base disk 1, are tabulated the values of the feed rate. This values are visible through openings or windows 15a, b, c and d in the base disk 1. These windows 15 are arranged in that portion of the base disk 1 which in normal use of the computer is not covered by the segments 3, 6 and 9. Each window 15 corresponds to a predetermined group of the material of the workpiece to be worked. A further scale 16 in terms of the width of the tool is arranged lengthwise of the windows 15 on the base disk 1, thereby determining exactly the reading field on the feed scale.

The course of calculation is as follows:

(a) The correction factors, i.e. the values of the life factor, tool diameter and pitch of the tool are adjusted one onto the other by turning, i.e. displacing the disk segments 3, 6 and 9. Thereby the window 11 is brought in a determined relative position with respect to the base disk 1. It is not deemed necessary to explain that with equally or logarithmically graduated scales the different fundamental mathematic operations, such as addition, subtraction, multiplication and division are automatically carried out. The type of operation to be performed depends naturally on the special relations between the different influence factors.

(b) Thereafter the disk 14 is displaced until the desired or selected value of the depth of cut appears in the window 11, whereafter the value of the feed rate which has to be determined can be read at the corresponding place in one of the windows 15.

This computer thus constitutes a simple auxiliary means for bringing a great number of correlated functions and values in an optimum relation to one another, i.e. to combine selected or given values of tool and workpiece depending functions in such a manner that the resulting values of the cutting conditions are optimum.

For tools of different type and for further group of workpiece materials it is necessary to provide similar computers with correspondingly changed tabulated values. Therefore the base disk 1, may have the shape of a rectangular plate. Such a plate can serve as base member for a plurality of computers arranged side by side. The whole device is preferably arranged near the working place or even directly on the machine tool carrying out the operation. It is also possible to secure a second base plate 1′ on the rear of the disk 14, which can serve as support for a second group of disks 3′, 6′ and 9′. The rear side of the disk 14 will then of course have thereon tabulated values corresponding e.g. to another tool, i.e. the disk 14 has the same functions for both sides of the computer.

FIGURES 2 and 3 show a further table-computer for determining the feed rate for a milling operation in function of several influence factors.

This computer comprises a base member 17 three annular disks 18, 19 and 20 in front thereof, and a top disk 22. The annular disks 18, 19 and 20 are centered by a disk 21 of greater thickness which is fixed on the base member 17. The disks or rings 18, 19 and 20 rotate on the outer edge (acting as a bearing surface) of disk 21. The disk 22 has an elongated window 23 therein which reveals a portion of a table 24 printed onto the front side of disk 21. The table 24 contains values of the feed rate which has to be determined in function of the said different influence factors. The rear side of the base member 17 is supporting a number of similar disks 18′, 19′, 20′, 21′ and 22′ having thereon scales and tables in terms of a different tool or of different workpiece materials. The base member 17 has printed thereon a scale 25 in terms of the pitch ($U/Z$) of the tool, annular disk 18 a scale 26 in terms of life factor F and a scale 27 in terms of characteristic factor K, annular disk 19 a scale 28 in terms of the width of the tool (milling cutter) and finally ring 20 a scale 20 in terms of the selected depth of cut.

The disk 22 has thereon, further to the functions already mentioned, a combined scale 30 in terms of the working direction of the tool, diameter of the tool and cutting edge material of the tool. At the periphery of the disk 22 is printed a tabulated scale 31 in terms of the workpiece material. The disks are provided with fixed adjusting marks 23′ and 32. For permitting easy displacement and adjustment of the annular disks they are provided with slightly projecting knobs 34. The rotatable disks, which are held together and centered by a pin 35, are pressed one onto the other by spring means 36, 37, thereby avoiding any unintentional displacement of the disks.

The following is a description of a calculating operation by means of the computer of FIGURES 2 and 3.

The following data are given.

(a) Dependent on the tool:

(1) Type of the tool=side-milling cutter
(2) Cutting edge material=high speed steel
(3) Diameter of the cutter=120 mm.
(4) Economic life factor=3 hours or F=3
(5) Up-milling process (direction)
(6) Pitch=U/Z=circumference/number of teeth=-18
(7) Width of cutter=30 mm.
(b) Dependent on the workpiece:
(8) Material of workpiece=St.C 35
(9) Depth of cut=15 mm.
(10) Characteristic factor K=7

As already mentioned the characteristic factor K, which is itself composed of factors $x_1$ to $x_4$, is different from section to section and furthermore subject to variations due to improved holder devices or improved cutting tools. It is therefore necessary to periodically control and correct these influence factors. The $x_n$ values are subdivided into different classes and retained in suitable tables. The characteristic factor is calculated as follows:

$$K=\Sigma(\pm x_1)+(\pm x_2+\ldots(\pm x_n)$$

Adjustment or setting of the table computer (the different setting positions are designated by the numbers I to IV in small circles in FIGURE 2):

(I) The life factor on scale 26 is brought on the given value of the pitch scale 25.
(II) The mark 23' on scale 28 is displaced on the given value of K (scale 27).
(III) The mark 32 on scale 29 is adjusted with the given value of the tool width (scale 28).
(IV) The selected material of the workpiece on the tabulated scale 31 is adjusted on the selected depth of cut (scale 29).
(V) Read on tabulated scale 24, through window 23, at the suitable place i.e. for an up-milling process with a cutter of a diameter of 120 mm. with an edge made of high speed steel, the value of the feed speed, which is in the present example 55 mm./min.

FIGURES 4 and 5 show a further table-computer which in this case serves to determine the cutting conditions for a turning operation in function of the most imporant influence factors.

The computer comprises a base member 41, two disks 42 and 43 securely fixed on the member 41, and three rotatable disks 44, 45 and 46. These disks are held together by a bolt 47 provided with a suitable head and a nut 48. Further members 49, 50 and 51 serve to support and center the said disks. The disks 42 and 43 are secured on plates 41 and 51 by means of a rivet 52. The whole computer is fixed on a frame 53.

The fixed base member 41 has thereon a scale 53 in terms of the number of revolutions of the machine (which correspond directly with the cutting speed to be determined). The annular disk 44 has thereon a logarithmic scale in terms of the diameter of the workpiece.

The fixed disk 42 has printed thereon a double scale 55 in terms of the characteristic factor K and the feed rate S per revolution of the workpiece. These values appear through the window 56 in the disk 45.

This disk 45 itself has thereon a double scale 57 in terms of the characteristic factor K (which appears two times on this computer) and the depth of cut, as well as a scale 58 in terms of the life factor F. The values of this latter scale 58 can be read through a window 59 in the top disk 46, which disk 46 has printed thereon tabulated values of the hard metal class 60 (of the cutting edge) and of different materials of the workpiece. These scales can be adjusted on scales on other disks which are drafted in terms of directly dependent functions. It is evident that the disk 46 leaves uncovered a small sector of at least determined portions of scales arranged thereunder. The disks which have to be displaced or turned are at least partly provided with recesses 62, 63 having flanged edges, in order to facilitate displacement.

The construction of the computer of FIGURES 4 and 5 particularly permits determination of stochastical values, i.e. values which in reality will be the most probable. As can be best seen in FIGURE 4 the double scales 55 and 57 have coarse graduations for the values of K, whilst fine graduations are provided for the values of the depth of cut ($a$) and the feed rate (S). The K graduation thereby corresponds to the field of dispersed or stochastical values of the K-factor which here replace the simple and exact mathematic functions. It is therefore possible to vary within the corresponding K field.

The abbreviations on the computer are used for:

WG=workpiece material group
K=characteristic factor
$a$=depth of cut
S=feed of tool per revolution of tool
F=life factor
n=number of revolutions of the workpiece per minute
Hm.Kl=hard metal class (cutting edge).

An example of a calculation by means of the computer of FIGURES 4 and 5 will be described hereinafter. Selected or given values:

(1) Characteristic factor $K=4$
(2) Hard metal class IV
(3) Life factor $F=2$
(4) Material of the workpiece=$St. 12=WG$ 3 (material group 3).

All these data 1 to 4 are selected by the calculator and entered into the working papers. To determine:

(1) $n$ revolutions per minute
(2) Depth of cut $a$
(3) Feed rate S per revolution of the workpiece.

Adjustment or setting of the scales.

(a) The different factors are adjusted with reference to one another. The disk 45 is displaced until the mark 64 at the left edge of the window 56 corresponds with the middle of the field of the characteristic factor $K=4$ on scale 55 of disc 42.

By this adjustment the disk 45 and therefore scale 58 (life factor) is brought in a determined relative position.

By the adjustments (a) and (b) the marks 66 of the workpiece material groups (disc 46) are adjusted on the cutting speed corresponding to the values of S=feed rate of the tool
$a$=depth of cut
F=economic life factor
WG=workpiece material.

(The cutting speed is symbolized by the position of the adjusting marks 66 of the workpiece material groups.)

(c) The workpiece diameter value is adjusted on WG 3.

The values which have to be determined are now read at the corresponding places.

In the window 67: $n$=number of revolutions per minute ($n$=320).

Select the suitable depth of cut $a$ below $K=4$ (2 to 3.8 mm.).

Select the suitable feed rate S above $K=4$ (0.2 to 0.4 mm.).

As seen in FIGURE 4 several values of feed rate S are possible for a determined characteristic factor K. The same is valid for the depth of cut $a$.

I claim:
1. A disk calculator, comprising: a base member; a first disk on one side of the base member and immovably affixed thereto, said disk defining an outer edge bearing surface; a plurality of concentric arcuate tables, one below the other, on the outer surface of said first disk; a first ring, rotating on the said outer edge surface of said first disk; first and second acruate scales, diametrically opposed, along the periphery of the outer surface of the first ring; a second ring, next to the first ring, rotating on said outer edge surface; a third arcuate scale along the periphery of the outer surface of the second ring; a third ring, next to the second ring, rotating on the said outer edge surface; a fourth arcuate scale along the periphery of the outer surface of the third ring;

said first, second, and third rings being of consecutively smaller outer diameter, whereby the peripheral scales on the first and second rings are visible;

a second disk, rotatable, next to the outer surface of said first disk, having an outer diameter greater than that of said first disk but less than the inner diameter of said fourth arcuate scale, whereby said first, second and third rings are prevented from slipping off the said outer edge bearing surface; a fifth scale along the periphery of the outer surface of said second disk, cooperating with the fourth scale; a radial window in said second disk, for revealing the arcuate tables; at least one scale on the second disk, arranged along one side of said window, for cooperating with the said tables; an arcuate scale, on the said one side of the base member, for cooperating with one of said first and second arcuate scales; a reference mark on said second ring, for cooperating with the other of said first and second arcuate scales; a reference mark on said third ring, for cooperating with the scale on said second ring; and means for holding the combination together and permitting rotation of said second disk.

2. The calculator of claim 1, including means for preventing accidental rotation of said first and second rings; and means associated with said first, second and third rings for facilitating movement thereof.

3. A disk calculator, comprising: a base member; first and second disks on either side of the base member and immovably affixed thereto, said disks defining outer edge bearing surfaces; a plurality of concentric arcuate tables, one below the other, on the outer surface of each of said first and second disks; a first pair of rings, located on either side of said base member, rotating on the said outer edge surface of respective ones of said first and second disks; first and second arcuate scales, diametrically opposed, along the periphery of the outer surface of each of said first pair of rings; a second pair of rings, next to respective ones of said first pair, rotating on the said outer edge surface of respective ones of said first and second disks; a third arcuate scale along the periphery of the outer surface of each of said second pair of rings; a third pair of rings, next to respective ones of said second pair, rotating on the said outer edge surface of respective ones of said first and second disks; a fourth arcuate scale along the periphery of the outer surface of each of said third pair of rings;

said first, second and third pair of rings being of consecutively smaller outer diameter, whereby the peripheral scales on the first and second pairs of rings are visible;

third and fourth rotatable disks, next to the outer surface of respective ones of said first and second disks, having an outer diameter greater than that of said first and second disks but less than the inner diameter of said fourth arcuate scale, whereby said first, second and third pairs of rings are prevented from slipping off said outer edge bearing surfaces; a fifth scale along the periphery of the outer surface of each of said third and fourth disks, cooperating with respective ones of said fourth scales; a radial window in each of said third and fuorth disks, for revealing said arcuate tables; at least one scale on each of said third and fourth disks, arranged along one side of each of said windows, for cooperating with said tables; an arcuate scale, on each side of said base member, for cooperating with a one of said first and second arcuate scales; a reference mark on each of said second pair of rings, for cooperating with the other of said first and second arcuate scales; a reference mark on each of said third pair of rings, for cooperating with the scale on each of said second pair of rings; and means for holding the combination together and permitting rotation of said third and fourth disks.

4. The calculator of claim 3, including resilient means for preventing accidental rotation of said first and second pairs of rings; and means associated with said first, second and third pairs of rings for facilitating movement thereof.

References Cited by the Examiner
UNITED STATES PATENTS

| | | | |
|---|---|---|---|
| 313,655 | 3/1885 | Child | 235—88 |
| 1,506,112 | 8/1924 | Cutshaw | 235—84 |
| 1,881,165 | 10/1932 | Becker. | |
| 2,289,110 | 7/1942 | Ernst et al. | 235—84 |
| 2,331,967 | 10/1943 | Ernst et al. | 235—84 |
| 2,422,663 | 6/1947 | Feild | 235—84 |
| 2,492,229 | 12/1949 | Le Blond et al. | 235—84 |
| 2,628,027 | 2/1953 | Baer | 235—84 |
| 3,016,190 | 1/1962 | Baumann | 235—84 |

LOUIS J. CAPOZI, *Primary Examiner.*

LEO SMILOW, C. G. COVELL, *Assistant Examiners.*